AUTOMATIC DISPATCH

Filed Sept. 9, 1953 8 Sheets-Sheet 1

INTERNAL CIRCUIT·1

EXTERNAL CIRCUIT·1

INVENTORS,
CARL R. RUBENSTEIN
RALPH W. SPAFFORD
BY Woodling & Frost,
Attorneys

INTERNAL CIRCUIT-2

EXTERNAL CIRCUIT-2

INVENTORS,
CARL R. RUBENSTEIN
RALPH W. SPAFFORD
BY Woodling and Krost,
Attorneys

INTERNAL CIRCUIT·3

EXTERNAL STATION·1

INVENTORS,
CARL R. RUBENSTEIN
RALPH W. SPAFFORD
BY Woodling & Krost,
Attorneys

Feb. 23, 1960 C. R. RUBENSTEIN ET AL 2,925,787
AUTOMATIC DISPATCH
Filed Sept. 9, 1953 8 Sheets-Sheet 4
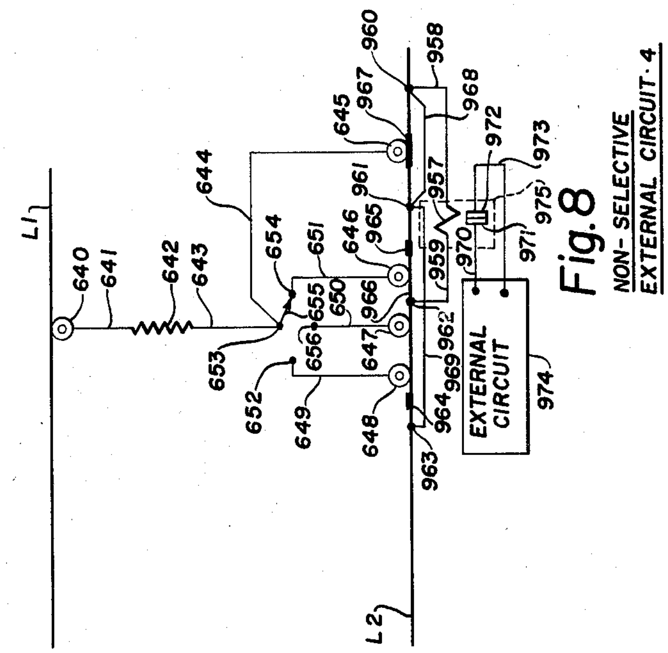
Fig.8 NON-SELECTIVE EXTERNAL CIRCUIT-4
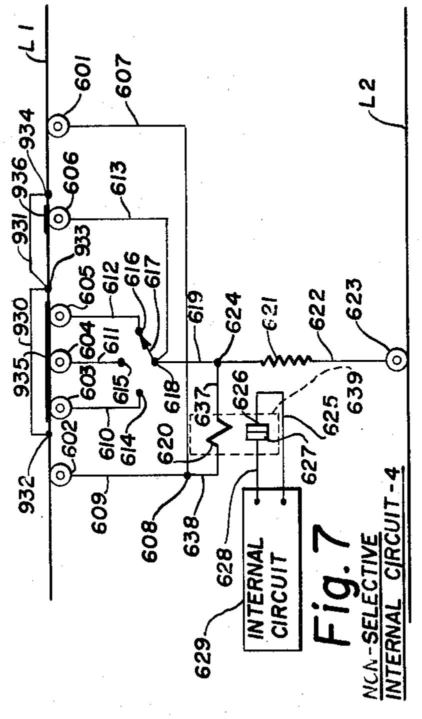
Fig.7 NON-SELECTIVE INTERNAL CIRCUIT-4
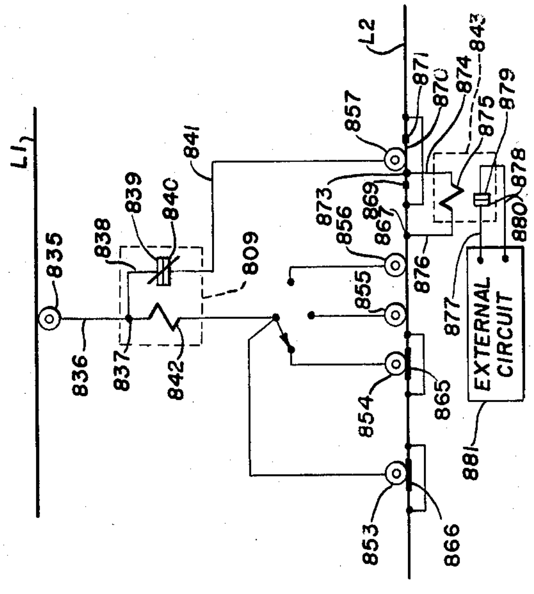
Fig.6 EXTERNAL CIRCUIT-3
INVENTORS,
CARL R. RUBENSTEIN
RALPH W. SPAFFORD
BY Woodling & Krost,
Attorneys

AUTOMATIC DISPATCH

Filed Sept. 9, 1953

INVENTORS,
CARL R. RUBENSTEIN
RALPH W. SPAFFORD
BY Woodling & Krost,
Attorneys

AUTOMATIC DISPATCH
Filed Sept. 9, 1953
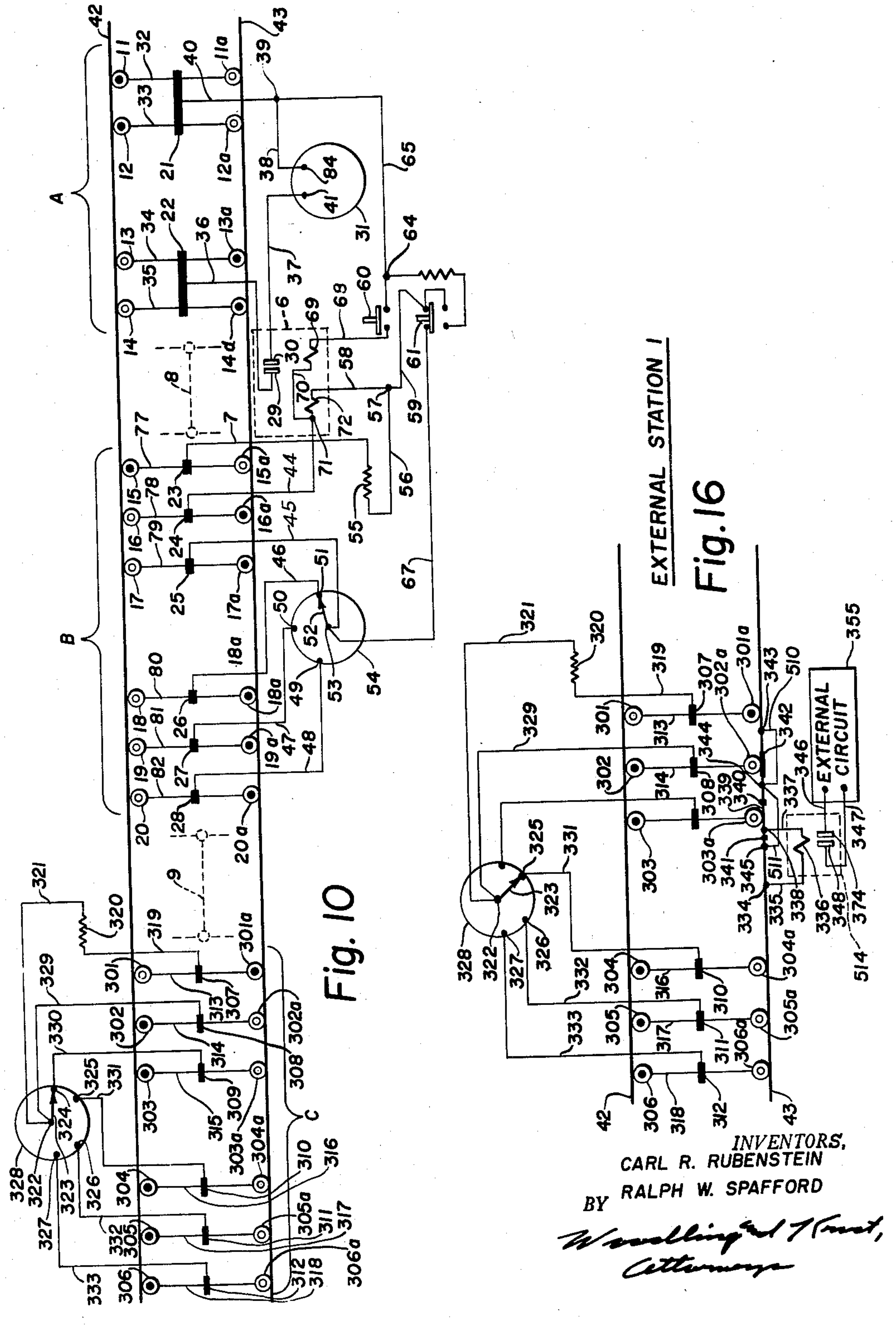
Fig. 10, EXTERNAL STATION I Fig. 16
INVENTORS,
CARL R. RUBENSTEIN
RALPH W. SPAFFORD
BY Woodling & Krost,
Attorneys AUTOMATIC DISPATCH
Filed Sept. 9, 1953 8 Sheets-Sheet 7
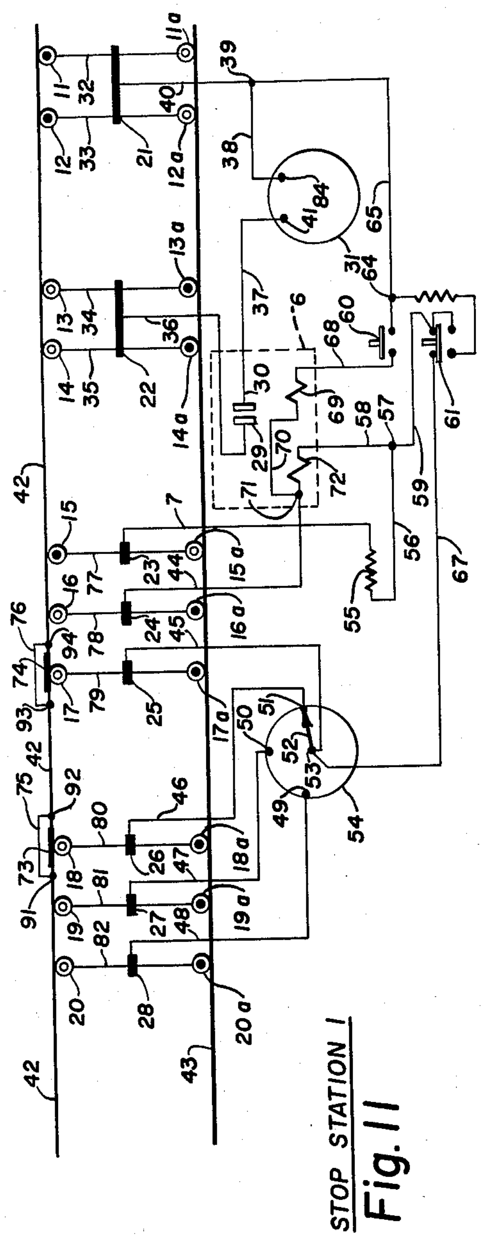
STOP STATION 1 Fig.11
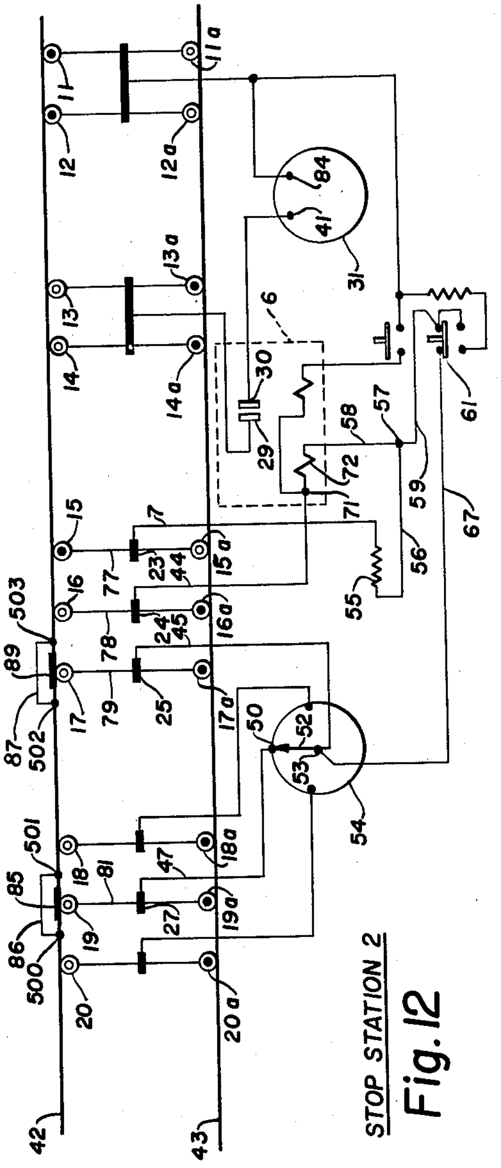
STOP STATION 2 Fig.12
INVENTORS,
CARL R. RUBENSTEIN
RALPH W. SPAFFORD
BY
Woodling and Krost,
Attorneys AUTOMATIC DISPATCH
Filed Sept. 9, 1953 8 Sheets-Sheet 8
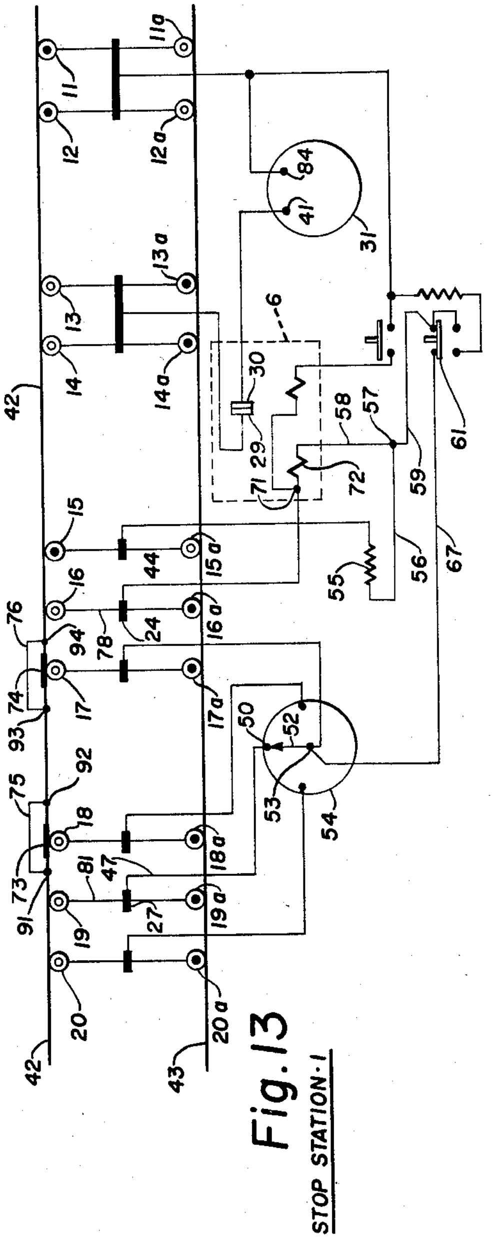
Fig. 13 STOP STATION·1
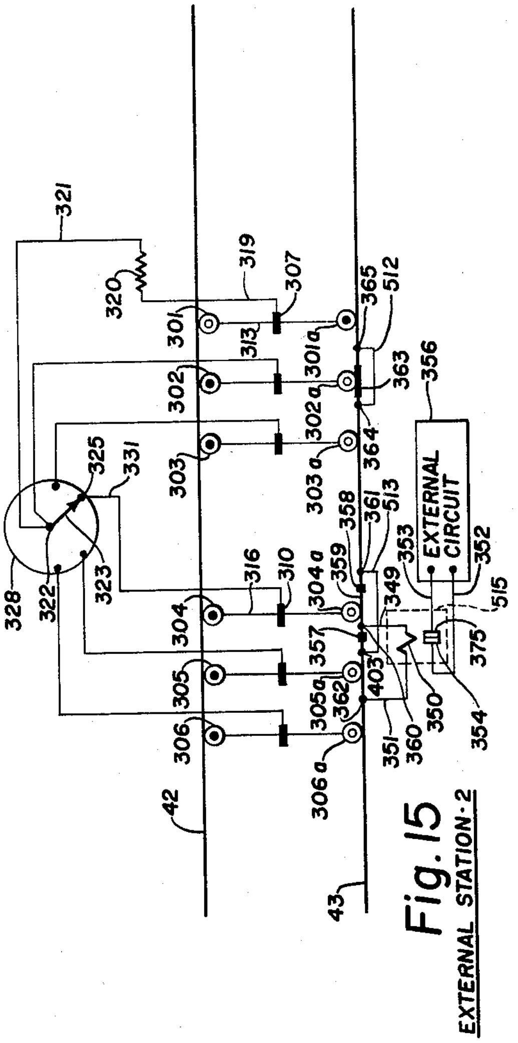
Fig. 15 EXTERNAL STATION·2
INVENTORS,
CARL R. RUBENSTEIN
RALPH W. SPAFFORD
BY
Woodling & Krost,
Attorneys.

United States Patent Office 2,925,787
Patented Feb. 23, 1960

2,925,787

AUTOMATIC DISPATCH

Carl R. Rubenstein and Ralph W. Spafford, Cleveland, Ohio

Application September 9, 1953, Serial No. 379,217

14 Claims. (Cl. 104—88)

Our invention relates to the automatic control of electrical circuits having functions incident to the use of a movable carrier, and apparatus and methods for obtaining such control.

An object of our invention is the automatic dispatch of a carrier movable along the route of electrical conductors so as to control the particular route traveled, the destination, the operation, and other functions incident to the use of the carrier.

Another object of our invention is the control of electrical circuits having functions incident to use of the carrier, both internal and external circuits.

Another object of our invention is the automatic control of operation of carriers and of devices used in association with the carriers, said carriers including monorail conveyors, railroad vehicles, both miniature and full scale, trackless trolleys, and other vehicles movable along the route of a plurality of electric conductors.

Another object is the provision for automatically controlling the operation of internal electrical circuits having functions incident to the use of a carrier such as the circuit of an electric motor movable with the carrier and driving the carrier, the circuit of an electric motor movable with the carrier and operating a hoist, crane, lifting bucket or magnet, the circuit of an electric bell, horn, light or timing device on the carrier, and other such devices movable with the carrier.

Another object is the provision for automatically controlling the operation of external electrical circuits incident to the use of a carrier such as the circuit of electrically operable mechanisms mounted in fixed positions along the route traveled by the carrier, including track-throwing switches determining the route or course to be traveled by a carrier, electrically operated track block systems and lockouts, electrically operated doors, gates, and warning mechanisms, such as a bell, light or horn.

Another object is the provision for automatically controlling selected internal and external electrical circuits having such functions incident to the use of a carrier movable along the route of the carrier, for operation of the selected circuits as the carrier reaches certain stations along the route of the carrier.

Another object is the provision for preselecting the stations at which are to be actuated the internal and external electrical circuits desired for operation as a carrier moves along a route.

Another object is the provision for setting a control mechanism movable with a carrier along a route so as to predetermine the operation of electrical circuits which are to be operated at desired stations along the route, such as internal circuits governing the starting and stopping of an electrically driven carrier and such as external circuits governing the switch-determined trackway to be followed by a track-traveling carrier.

Another object of our invention is to provide an electrical control system such that a carrier or a group of carriers can operate over a trackway, each taking its own predetermined route and such that the control collectors and the power collectors may ride on the same conductors with neither one interfering with the other.

Another object is the provision of a system that can be used so that electrical impulses can be fed to electrical controls mounted adjacent the trackway only by those carriers which are set to match the needed condition.

Another object of this invention is to provide an electrical control method whereby a carrier can be dispatched to a preselected particular destination and stop, or perform some other function on the moving unit, and other carriers not set for this particular destination will not be affected by this preselection made for the first carrier but will continue to their own preselected destination.

Another object is the provision of improved means for carrying out the foregoing objects.

Another object is the provision of an improved method for carrying out the foregoing objects.

Another object is the provision of apparatus for performing the foregoing objects in a surer, more dependable, and safer manner and for accomplishing the same in a more economical way, including economy in the initial installation and in maintenance.

Another object is the provision for obtaining results not heretofore had and by means and methods not heretofore known.

Other objects and a fuller understanding of the invention may be had by referring to the following description and claims, taken in conjunction with the accompanying drawings, in which:

Figure 6 is a diagrammatical illustration of an embodiment of said third form of our invention as adapted for controlling an external electrical circuit;

Figure 7 is a diagrammatical illustration of an embodiment of said first form of our invention as adapted for controlling an internal electrical circuit and showing an arrangement for nonselective operation at a station where such nonselective operation of an internal circuit is desired;

Figure 8 is a diagrammatical illustration of an embodiment of said first form of our invention as adapted for controlling an external circuit and showing an arrangement for nonselective operation at a station where such nonselective operation of an external circuit is desired;

Figure 1:
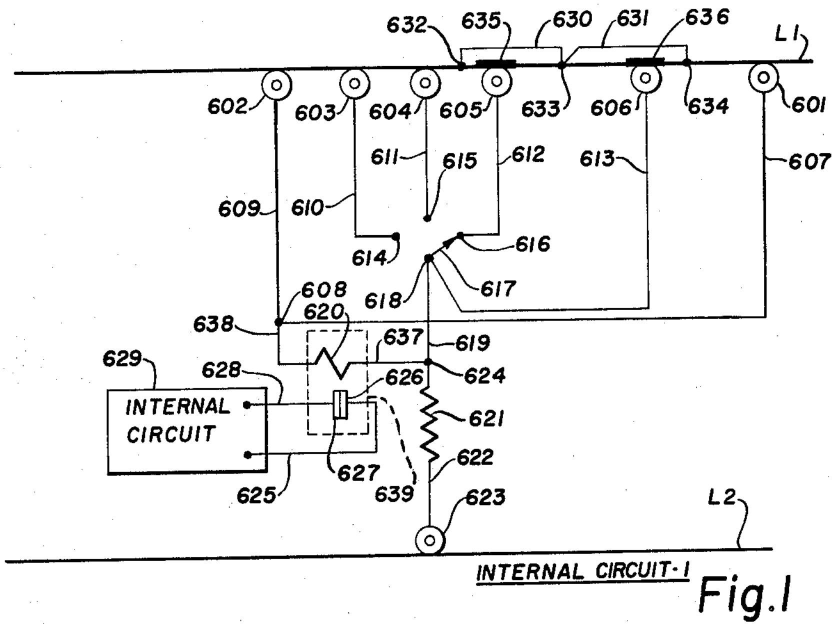
Figure 1 is a diagrammatical illustration of an embodiment of one form of our invention as adapted for controlling an internal electrical circuit.
Figure 2:
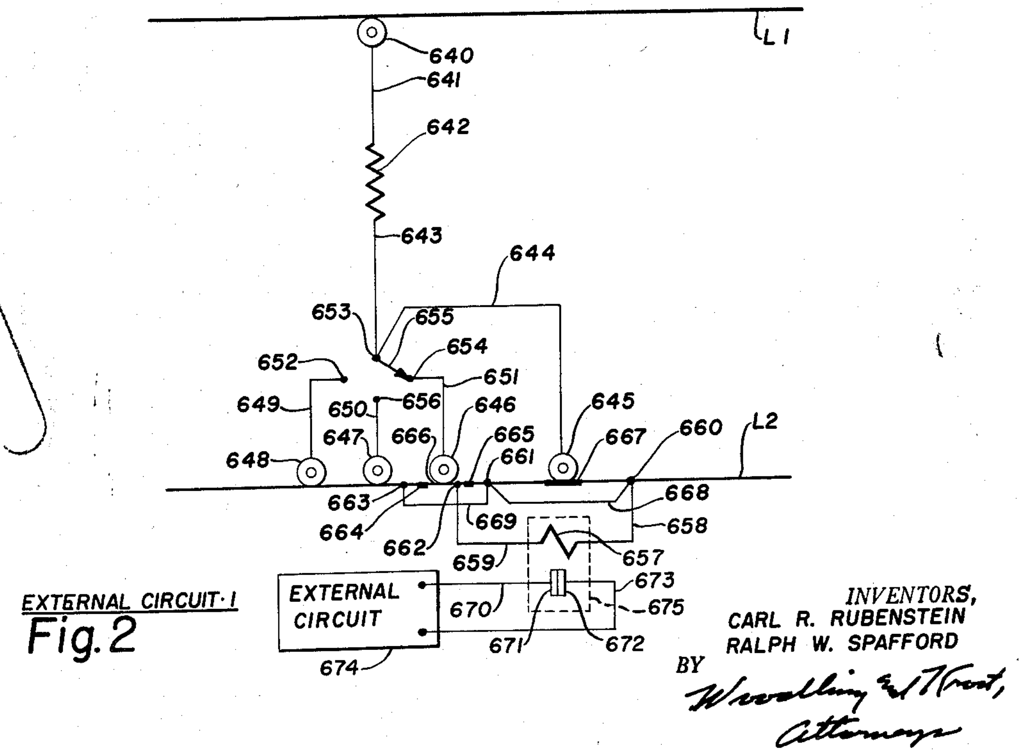
Figure 2 is a diagrammatical illustration of an embodiment of said one form of our invention as adapted for controlling an external electrical circuit.
Figure 14:
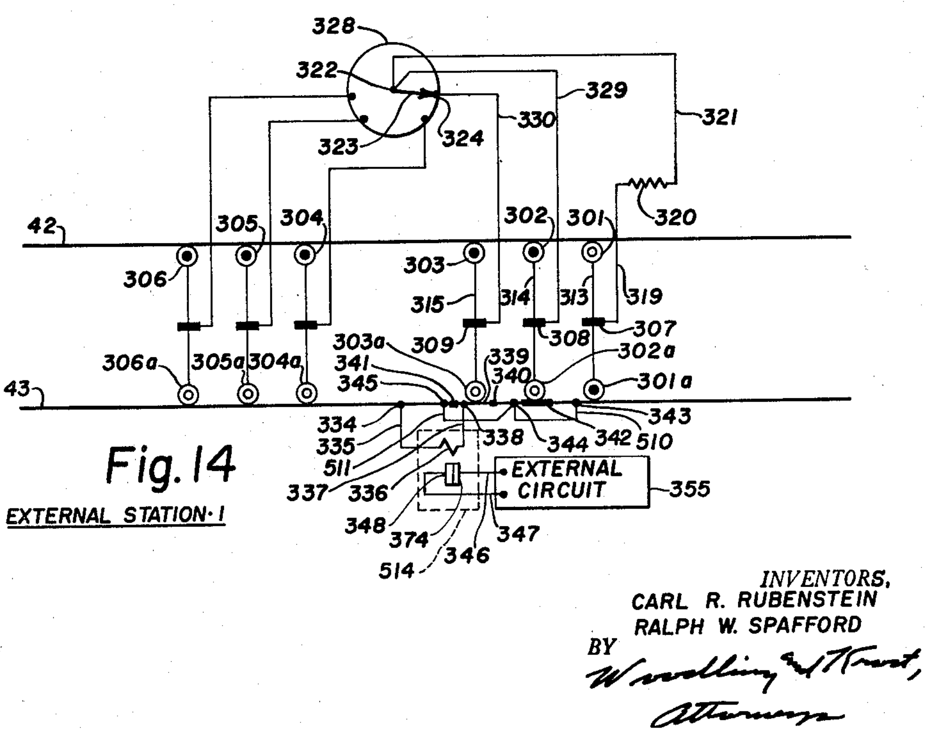

Figure 10 is a diagrammatical illustration of an embodiment of said first form of our invention showing in greater detail the parts and circuit arrangement than was shown in Figures 1 and 2, and illustrates by way of example the adaptation of the invention to a carrier, such as an electric train, movable along a pair of electrical conductors, such as train tracks, at a location other than a station. The view of Figure 10 shows the parts and circuit arrangement which are movable with the carrier along the route determined by the conductors;

Figure 11 is a diagrammatical illustration of the portions of the carrier, parts and circuit arrangement indicated generally by the brackets marked A and B in Figure 10 and shows the relationship of parts when the carrier is located at a station referred to as stop station number one and the selective switch mechanism is set or adjusted in correspondence with the character of that station;

Figure 12 is a diagrammatical illustration of the portions of the carrier, parts and circuit arrangement indicated generally by the brackets A and B in Figure 10 and shows the relationship of parts when the carrier is located at another station referred to as stop station number two and the selective switch mechanism is set or adjusted in correspondence with the character of that station;

Figure 13 is a diagrammatical illustration similar to that of Figure 11 (when the carrier is located at stop station number one) but shows the relationship of parts when the selective switch mechanism is set or adjusted other than in correspondence with, or at variance with, the character of that station;

Figure 14 is a diagrammatical illustration of the portion of the carrier, parts and circuit arrangement indicated generally by the bracket marked C in Figure 10 and shows the relationship of parts when the carrier is located at a station referred to as external station number one (such as where a first track switch is to be controlled) and the selective switch mechanism is set or adjusted in correspondence with the character of that station;

Figure 15 is a diagrammatical illustration of the portion of the carrier, parts and circuit arrangement indicated generally by the bracket marked C in Figure 10 and shows the relationship of parts when the carrier is located at another station referred to as external station number two (such as where a second track switch is to be controlled) and the selective switch mechanism is set or adjusted in correspondence with the character of that station; and Figure 16 is a diagrammatical illustration similar to that of Figure 14 (when the carrier is at external station number one) but shows the relationship of parts when the selective switch mechanism is set or adjusted other than in correspondence with, or at variance with, the character of that station.

In the four sets of arrangements for operating internal and external circuits, as shown in Figures 1 to 8 inclusive, there is a feature which is common to each and which is here described. A series of collectors are spaced longitudinally along a carrier a specific distance apart. Isolated or control segments that are either insulators or small sections of insulated conductor bar are located in the conductor bar at each station along the route and positioned at intervals a given distance apart, which is the same as the corresponding spacing of the current collectors on the carrier. When the selected set of collectors reach the station where the spacing of the isolated or control segments (either insulators or insulated bar sections) is the same as, or corresponds with, the spacing of the selected collectors, the current in the internal circuit on the carrier or the external circuit on the trackway, depending upon which is selected, will change.

In the diagrammatical views of Figures 1 to 8, inclusive, the elongated conductors, bars, rails or wires, denoted by the reference characters L1 (line 1) and L2 (line 2) are electrically connected with a suitable source of electrical energy so as to impress a potential across L1 and L2.

In the "internal circuit"—operating arrangement No. 1 shown in Figure 1—the current path is as follows: L2 to collector 623, lead 622, resistor 621 to terminal 624. There are three possible paths of current from this point to L1. As shown in Figure 1, two paths are now blocked. These are as follows: from terminal 624, lead 619, common terminal 618 on a multiple tap selector switch. One path—terminal 618, lead 613, collector 606 to insulator 636 in L1—is blocked. The other path—selector switch arm 617, terminal 616, lead 612, collector 605 to insulator 635 in L1—is also blocked. Since both of these paths are simultaneously blocked, current will have to take the third path from terminal 624. This is—lead 637, relay coil 620, lead 638, terminal 608, leads 607 and 609 to collectors 601 and 602, respectively, on L1. This will cause relay coil 620 to be energized closing contacts 626 and 627 connected to leads 625 and 628 to the internal circuit 629. Coil 620 and contacts 626 and 627 make up a relay 639 indicated by the broken line.

The selectivity is accomplished because both short circuiting paths must be blocked at the same time so that current will flow through the relay coil. If the selector switch arm 617 had been set to either taps 615 or 614, which are connected to collectors 604 and 603, respectively, through leads 611 and 610, this path would not be blocked because one of these collectors would be making electrical contact with L1 when collector 606 was on insulator 636. When collector 603 or 604 had moved so as to be in contact with insulator 635, collector 606 would be making contact with L1. Terminals 632, 633 and 634 and jumper leads 630 and 631 are used to provide continuity in power supply line L1.

The insulators used for preventing current from flowing between the conductor L1 and a collector engaging the conductor at a certain point may be solid blocks of insulation, such as 635 and 636, placed in the line with current passed around them by jumpers, such as 630 and 631, or the insulators may be insulating sleeves around the conductor so that continuity of the flow of current is maintained. In either arrangement, the character of the construction is such that current does not pass between the conductor and a collector positioned at that point.

In the "external circuit"—operating arrangement No. 1 shown in Figure 2—a relay indicated in block form by the reference character 675, consisting of coil 657 and contacts 671 and 672, is mounted adjacent to the trackway. The current path of the circuit is as follows: L1 to collector 640, lead 641, resistor 642, lead 643 to common terminal 653 of a multiple tap selector switch. From terminal 653, there would ordinarily be two current paths to L2. One path—terminal 653, lead 644, collector 645—is blocked from L2 because collector 645 is engaging insulator 667. The other current path is—terminal 653, tap selector 655, terminal 654, lead 651, collector 646 engaging a short insulated section of bar 666 insulated from L2 by insulators 664 and 665. From short section of bar 666, current flows through terminal 662, lead 659, coil 657, lead 658 to terminals 660 on L2. Coil 657 is thereby energized, closing contacts 671 and 672 to leads 670 and 673 for the external circuit 674.

Selectivity is accomplished because the collector selected by the switch and the collector 645 must be exactly the same distance apart as the insulator which is engaged by collector 645 and the short bar section 666 which is engaged by the selected collector. If the selector switch had been set to terminal 656 or 652 so as to be connected to collector 647 through lead 650, or collector 648 through lead 649, then the current path to collector 647 or 648 would be directly to L2 when collector 645 is on insulator 667. When so set and when the unit has moved so that collector 647 or 648 would engage short bar section 666, collector 645 would be engaging L2. Consequently, since current will take the path of least resistance, practically all of the current will flow from terminal 653 through lead 644, collector 645 to L2. Relay coil 657 will not become energized under this condition.

The character of the short insulated bar section, such as 666, is such that current passes between the insulated bar section and a collector engaging the conductor at that point, but current does not pass through the insulated bar section from adjoining portions of the conductors. To distinguish the character of the short bar sections, such as 666, from the character of line insulators, such as 667, it might be said that the short bar sections, such as 666, permit transverse or lateral flow of current therethrough but not longitudinal flow, while insulators, such as 667, permit longitudinal flow therethrough but not transverse or lateral flow. Both such types of sections or segments are referred to as isolated or control segments or sections. The two types of control sections (line insulators and insulated sections) therefore have different electrical conducting characteristics, both from each other and from other portions of the conductor.

Terminals 660, 661 and 663 and jumper leads 668 and 669 are used to provide continuity in power supply line L2.

Since one side of relay coil 657 is connected to L2 through lead 658, the coil cannot be energized when a double set of power collectors electrically connected together momentarily make this short bar section 666, L2 potential. This section of bar must be of a potential other than L2 to supply a voltage to coil 657.

In the "internal circuit"—operating arrangement No. 2 shown in Figure 3—the current path is as follows: L2, collector 706, lead 705 to terminal 704 on resistor 703. Current divides into two paths. One is as follows: through part of resistor 703 to terminal 702, lead 690, terminal 691, leads 719 and 720 to collectors 680 and 681, engaging L1. The spacing between collectors 680 and 681 is greater than the length of any insulator, so that the 702 side of resistor 703 is always connected to L1. The other current path from 704 is as follows: Part of resistor 703 to terminal 698. There are three possible current paths to L1 from this point, two of which are shown blocked. These current paths are removed in exactly the same way as described in internal circuit, arrangement No. 1 in Figure 1. Collectors 684 and 685 which terminate these two paths are on insulators 717 and 718, simultaneously. Current then must flow from terminal 698 through lead 699, relay coil 700, lead 701 to terminal 702, which is connected to L1 as previously described. Relay contacts 708 and 709 close to connect leads 707 and 710 to the internal circuit 711. Coil 700 and contacts 708 and 709 comprise a relay indicated in block form by the reference character 721. Collectors 682 and 683 are other spaced collectors connected to the selector switch which may be used in the same manner as described in Figure 1.

Figure 3:
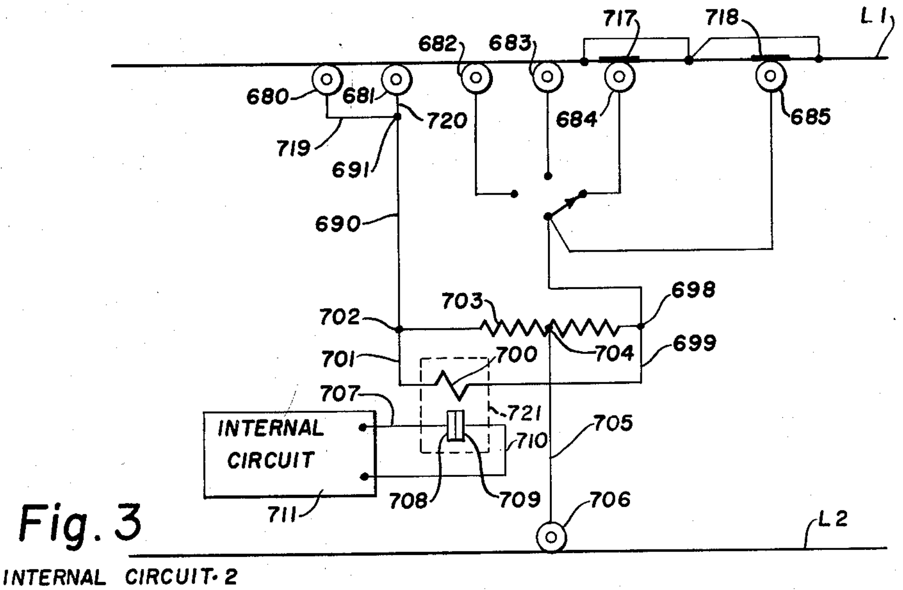
Figure 3 is a diagrammatical illustration of an embodiment of a second form of our invention as adapted for controlling an internal electrical circuit.
Figure 4:
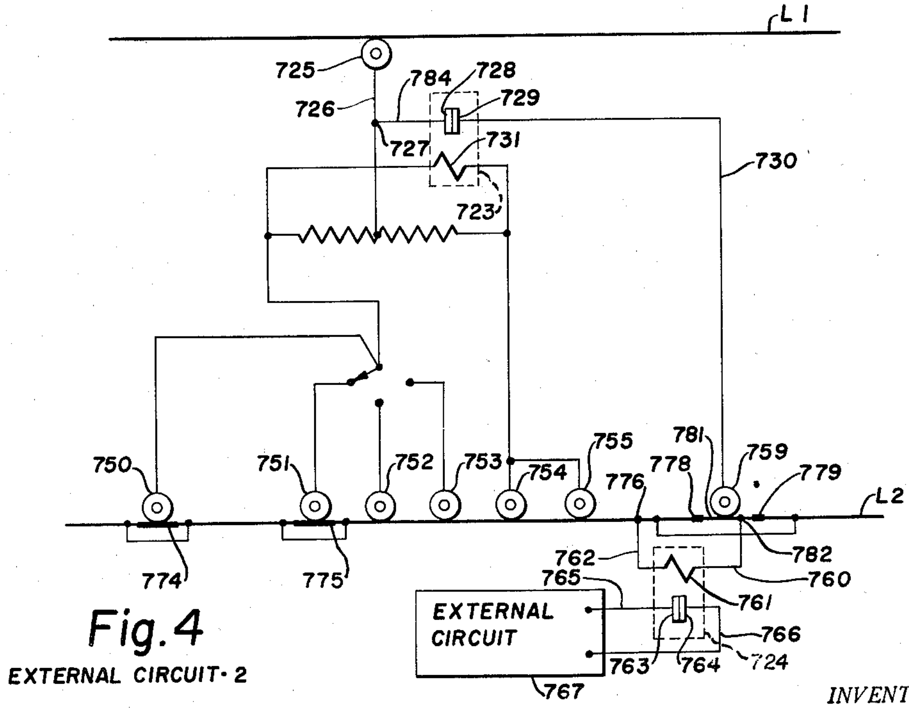
Figure 4 is a diagrammatical illustration of an embodiment of said second form of our invention as adapted for controlling an external electrical circuit.

In the "external circuit"—operating arrangement No. 2 shown in Figure 4—part of the circuit is similar to arrangement No. 2 of Figure 3, except that the relay contacts of relay 721 which were connected to the internal circuit in Figure 3 are used to connect L1 to a collector which engages a small insulated bar section in the L2 bar in Figure 4. When the coil 731 of relay 723 is energized in the same manner as described in internal circuit No. 2 (Figure 3), current flows from collector 725 engaging L1, lead 726, terminal 727, lead 784, relay contacts 728 and 729, lead 730, collector 759 engaging a short section of bar 781 insulated from L2 by insulators 778 and 779. Current continues through terminal 782, lead 760, coil 761 of relay 724, lead 762 to terminal 776 on L2. Contacts 763 and 764 close to connect leads 765 and 766 to external circuit 767.

The collector 759 is spaced from collectors 750 and 751 so as to engage the short insulated bar section 781 at the same time that collectors 750 and 751 are engaging line insulators 774 and 775. Relay 723 is thus energized so as to cause energization of relay 724.

Collectors 752 and 753 are other spaced collectors connected to the selector switch which may be used in the same manner for selectivity as described in connection with Figure 2. Collectors 754 and 755 correspond in operation to collectors 680 and 681 of Figure 3.

In the "internal circuit"—operating arrangement No. 3 shown in Figure 5—the current path is as follows: L2 to collector 817, lead 816, coil 815 of relay 805, lead 814 to common terminal 813 on the selector switch. There are two possible current paths from here terminating in collectors 804 and 808, both of which are disconnected from L1 by simultaneous engagement of line insulators 830 and 827 in a similar manner to that described in arrangements No. 1 and No. 2 for internal circuits (Figures 1 and 3). Relay coil 815 becomes de-energized, causing relay contacts 819 and 820 which are so biased to be opened. This breaks the circuit from leads 818 and 821 to the internal circuit 822. In this circuit, relay coil 815 is always energized when the carrier is away from the selected station. Collectors 801 and 802 are other spaced collectors connected to the selector switch which may be used in the same manner as described in Figures 1 and 3.

Figure 5:
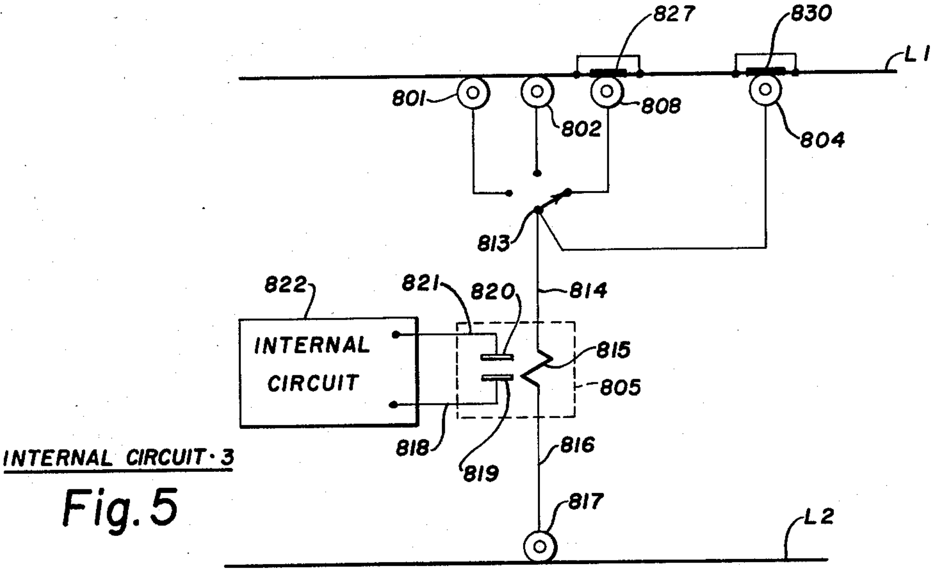
Figure 5 is a diagrammatical illustration of an embodiment of a third form of our invention as adapted for controlling an internal electrical circuit.

In the arrangement No. 3 for external circuit as shown in Figure 6, the circuit is similar to arrangement No. 3 as shown in Figure 5. The normally closed relay contacts 839 and 840 of relay 809 of Figure 6 correspond in function to the normally open relay contacts 819 and 820 of relay 805 of Figure 5. The relay coil 842 of Figure 6 is de-energized in the same manner as relay coil 815 of Figure 5. Current flows from collector 835 engaging L1, lead 836, terminal 837, lead 838, relay contacts 839 and 840, lead 841, collector 857, engaging a short section of bar 870 insulated from L2 by insulators 869 and 871. Current continues through terminal 873, lead 874, relay coil 875, lead 876, to terminal 867 on L2. Contacts 878 and 879 close to connect leads 877 and 880 to external circuit 881.

The collector 857 is spaced from collectors 853 and 854 so as to engage the short insulated bar section 870 at the same time that collectors 853 and 854 are engaging line insulators 866 and 865. Relay 809 is thus de-energized so as to cause energization of relay 843.

Collectors 855 and 856 are other spaced collectors connected to the selector switch which may be used in the same manner for selectivity as described in Figures 2 and 4.

Preferably, a protective resistor is inserted in lead 841 in arrangement No. 3 (Figure 6) or in lead 730 in arrangement No. 2 (Figure 4) operating external circuits so that there would not be a short circuit from L1 to L2 if the respective relay contacts should stay closed when the collectors 857 or 759 are making contact with L2.

The nonselective arrangements for operating internal and external circuits, as shown in Figures 7 and 8, contain the same basic principle of correspondence of longitudinal spacing of the collectors movable with the carrier and of isolated or control sections or segments along the conductors as described in connection with the selective circuits shown in Figures 1 to 6, inclusive.

The object of the nonselective circuits of Figures 7 and 8 is that every carrier of a desired group of carriers that passes a nonselective or universal station arranged for operating an internal circuit or for operating an external circuit at that station will always perform the same operation even though each of the said carriers may currently have a different selector switch dial setting.

The nonselective "internal circuit"—operating arrangement No. 4 as shown in Figure 7—is accomplished by making the line insulator 935 that is normally engaged by the selected collector long enough so that all collectors connected to the selector switch will engage this line insulator exactly when the collector connected to the common tap on the selector switch engages the second line insulator 936. Thus, both short circuiting paths around the relay coil will be removed at the same time.

The set of collectors, dial switch, resistor and relay of Figure 7 are the same as those described in the internal circuit schematic drawing of Figure 1. The same numbering system has been used to show the similarity.

The circuit is as follows: L2, collector 623, lead 622, resistor 621 to terminal 624. From this point, there are three possible paths of current flow to L1, two of which are blocked in the circuit as shown. One is as follows: terminal 624, lead 619, terminal 618 on the selector switch, lead 613, collector 606 which engages line insulator 936 in L1. The other blocked path is: terminal 624, lead 619, terminal 618 on the selector switch, selector switch arm 617, terminal 616, lead 612 to collector 605 on line insulator 935 in L1. This path would also be blocked if the selector switch arm 617 were set to terminal 615 or 614, which are respectively connected to collectors 604 and 603, since both of them are also simultaneously engaging the same insulator 935.

Since two of the current paths from terminal 624 are blocked, current will have to take the third path which is as follows: terminal 624, lead 637, coil 620 of relay 639, lead 638, terminal 608, leads 609 and 607 to collectors 602 and 601, making contact with L1.

Relay coil 620 is energized, closing contacts 626 and 627 to leads 625 and 628 for internal circuit 629.

Terminals 932, 933 and 934 and jumper leads 930 and 931 are used to complete power continuity of L1.

The set of collectors, resistor and selective dial switch of Figure 8 are the same as those described in the "external circuit"—operating arrangement No. 1 of Figure 2. The same numbering system has been used to show the similarity.

The circuit is as follows: L1, collector 640, lead 641, resistor 642, lead 643 to common terminal 653 on the selector switch. There are two possible current paths from this point, one of which is blocked. The blocked path is: terminal 653, lead 644, collector 645 which engages line insulator 967 in L2.

The other path is: terminal 653, selector switch arm 655, terminal 654, lead 651, collector 646 to the short insulated section of bar 966 insulated from L2 by insulators 964 and 965. The path continues: terminal 962, lead 959, coil 957 of relay 975, lead 958 to terminal 960 on L2.

Relay coil 957 is energized, closing contacts 971 and 972 to leads 970 and 973 for external circuit 974.

Relay coil 957 will be energized regardless of the setting of the selector switch arm 655. If selector switch arm 655 were set to either terminal 656 or 652 as to be connected to collector 647 or 648, the circuit would still be completed through the short section of bar 966, since collector 645 would be engaging line insulator 967 at the same time.

Terminals 963, 961 and 960 and leads 969 and 968 are used to complete power continuity of L2.

Again, it may be noted that there are two general types of control segments or isolated sections positioned along a conductor at a station, the spacing and the natures of the segments or sections determining the operating characteristics at that station. One type of such control segment or section is illustrated by the line insulators 935 and 936 of Figure 7 and 967 of Figure 8, in which current may not pass laterally or transversely to collectors engaging the line insulators. Another type of such control segment or section is illustrated by the insulated bar section 966 of Figure 8, in which current may pass laterally or transversely to collectors engaging the bar section but not longitudinally therethrough from the adjoining conductor L2. The variation in choice of type of control sections or segments and of their disposition or relative spacing provides for creating the desired operating or control characteristics of each station along the route of the carrier traveling alongside the conductors L1 and L2. The electrical conducting characteristics of each type of control or isolated segment or section relative to a collector engaging the same are different from each other and from other portions of the conductor at locations other than at a station.

Figure 9:
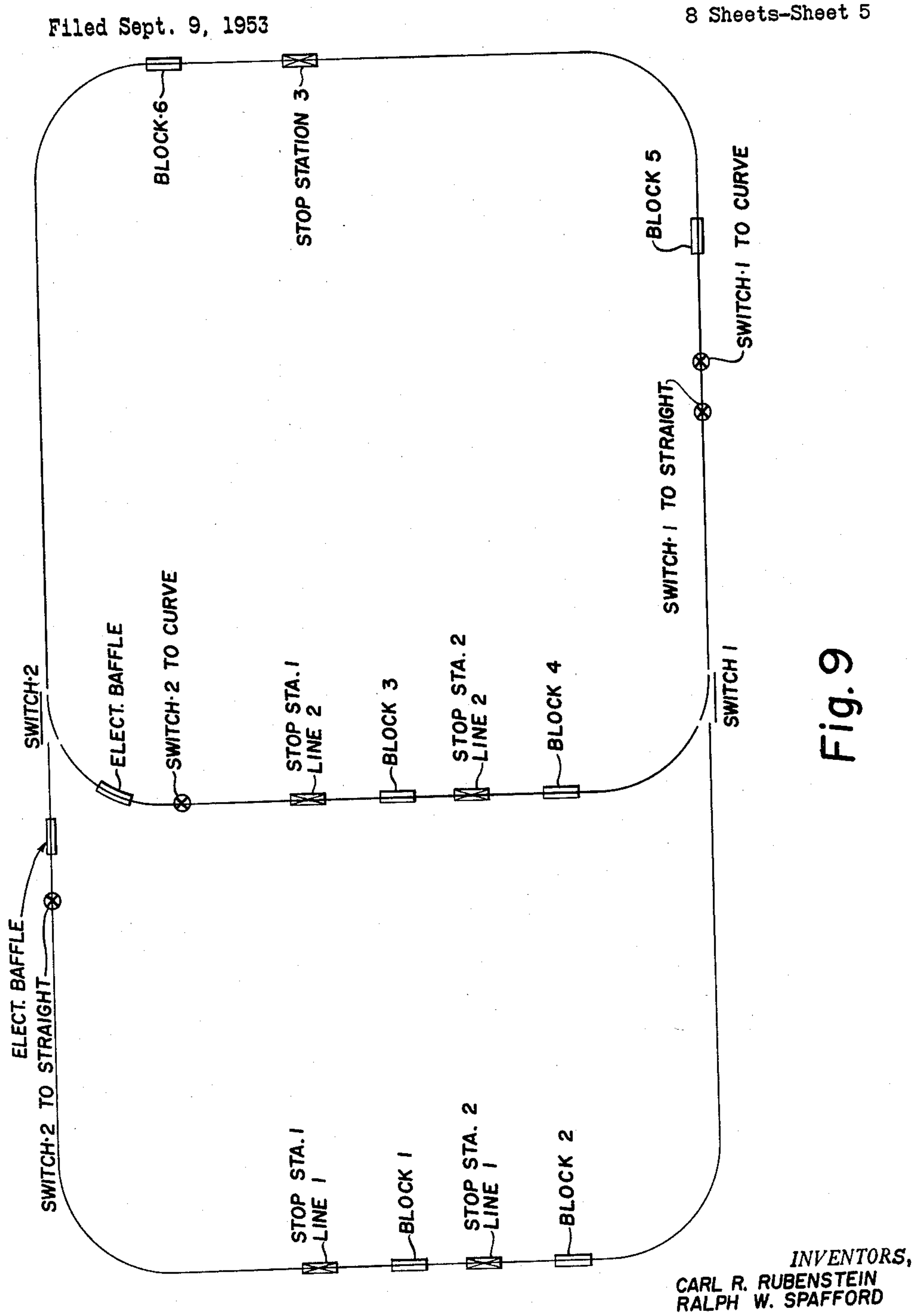
Figure 9 is a diagrammatical illustration of a track system such as that of a mono-rail conveyor system and disclosing by way of example an application of our invention to such a track system.

Figure 9 shows a simple representative trackway of an automatic dispatch system, which illustrates a simple application of our invention. This trackway may be equipped with conventional blocks to prevent carriers from running into each other.

If a carrier were at stop station 3 and it is desired to send the carrier to stop station 1, track line 2, the station selector dial on the carrier would be set to station 1, and the switch selector dial on the carrier would be set to track line 2. Momentarily pressing the start button would set the carrier in motion. The carrier would pass block 5 if clear and proceed to "switch 1 to curve station." Here the control collectors on the carrier would engage track control segments or isolated sections of the arrangement for operation of an external circuit, such as shown by Figure 2, and track switch 1 would be thrown or actuated so that the carrier would turn and proceed along track line 2. As the carrier proceeded to the "switch 1 to straight station" no external circuit would be energized (as shown in Figure 16) because of the discrepancy or lack of correspondence between the carrier dial setting and spacing of track control sections at that station. The carrier then proceeds on track line 2, through block 4 if clear, past stop station 2, track line 2, through block 3, if clear, to stop station 1, track line 2. Here the carrier will stop due to the dial setting and spacing of control segments or isolated sections of the arrangement for operation of an internal circuit such as that shown in Figure 1. When approaching the double end of a track switch such as when at the station of switch 2 of Figure 9, the carrier always operates or actuates the external circuit control at the station regardless of the dial setting (such as shown in the arrangement of Figure 8).

In similar manner the carrier can be sent to any predetermined station on any track line and internal circuits, such as for the motor of the carrier, and external circuits, such as for track-switch operating mechanisms, can be operated at desired stations by appropriate settings of the selective dial switches on the carrier.

For the purpose of demonstrating an application of our invention to a system of a carrier movable along a pair of electrical conductors, such as a train movable along a pair of electrically conducting tracks, in the following figures we illustrate in more detail and particularity the adaptation of the form of our invention, of which the principle was shown in Figures 1 and 2. The principal parts are first described and thereafter the circuits are described and explained.

Reference character 31 of Figure 10 represents the electric motor for driving a carrier. Reference characters 42 and 43 represent a source of continuous power supply. Insulated bar sections in the power supply are jumpered by leads, thus preserving continuity of power supply. Reference characters 29 and 30 represent contacts of an electrically actuated, mechanically-held relay, indicated by reference character 6.

Reference character 69 represents the latching coil of the mechanically-held relay 6, which coil, when momentarily electrically energized, closes contacts 29 and 30 and actuates a mechanically operated latching mechanism, which holds contacts 29 and 30 closed. Reference character 72 represents the unlatching coil of the mechanically-held relay 6, which coil, when momentarily electrically energized, opens contacts 29 and 30 and actuates the mechanically operated latching mechanism to hold contacts 29 and 30 in the open position.

Reference character 55 represents a resistor whose wattage rating allows it to be continuously connected across the power supply. When it is connected in series with unlatching coil 72 across the power supply, sufficient current flows to energize coil 72.

Reference character 54 represents a dial or selective switch on the carrier and such that its movable contact 52 makes an electrical contact with its common terminal 53 and one of its selective terminals 49 or 50 or 51.

Reference character 60 represents a push-button that can start the carrier in motion. Reference character 61 represents a push-button that can stop the motion of the carrier.

Reference character 320 represents a resistor whose wattage rating allows it to be continuously connected across the power supply. When it is connected in series with a coil such as 336 (Figure 14) across the power supply, sufficient current flows to energize the coil.

Reference character 328 represents a dial or selective switch on the carrier and such that its movable contact 323 makes an electrical contact with its common terminal 322 and one of its selective terminals 324, 325, 326 or 327.

Reference character 8 of Figure 10 represents a mechanical linkage between that part of the carrier shown within the bracket A, which includes the travel motor, and that part of the carrier shown within the bracket B, which includes the "circuit in" portion of the control system.

Reference character 9 of Figure 10 represents a mechanical linkage between that part of the carrier shown within the bracket B, which includes the "circuit in" portion of the control system, and that part of the carrier shown within the bracket C, which includes the "circuit out" portion of the control system. The carrier may be one vehicle or a series of vehicles joined to move together and operate together.

Collectors 11, 12, 13*a* and 14*a* of the portion of the carrier shown in bracket A are insulated from their corresponding shafts 32 through 35 to which they are connected, as indicated by the solid centers in the circles representing these collectors.

Collectors 11*a*, 12*a*, 13 and 14 make electrical contact with their corresponding shafts 32 to 35 to which they are connected, as indicated by the open rings in the circles representing these collectors.

Collectors 15 and 16*a* through 20*a*, inclusive, are electrically insulated from their corresponding shafts 77 through 82, as indicated.

Collectors 15*a* and 16 through 20, inclusive, are electrically connected to their corresponding shafts 77 through 82, as indicated.

Collectors 301*a* and 302 through 306, inclusive, are electrically insulated from their corresponding shafts 313 through 318, as indicated.

Collectors 301 and 302*a* through 306*a*, inclusive, are electrically connected to their corresponding shafts 313 through 318, as indicated.

Power is supplied to carrier motor 31, Figure 10, in the following manner: Collectors 13 and 14 engage power supply line 42. Their longitudinal spacing with respect to the trackway power supply is greater than that of any control or isolated sections, for example, such as that of 73 and 74 in Figure 11. Hence, at all times, collector 13 or 14 or both engage power supply line 42. Current then flows from power supply line 42 through collector 13 and/or 14, through collector shaft 34 and/or 35 to current pick-up 22, lead 36, contacts 29 and 30 when closed (contacts 29 and 30 shown open in Figure 10), lead 37, motor terminal 41, through carrier motor windings, motor terminal 84, lead 38, terminal 39, lead 40, current pick-up 21, collector shafts 32 and/or 33, collectors 11*a* and/or 12*a* to power supply line 43. The longitudinal spacing of collectors 11*a* and 12*a* with respect to the trackway power supply is greater than the spacng arrangement of any control or isolated sections, for example, such as of 339 and 342 of Figure 14.

To set the carrier in motion, contacts 29 and 30 must be closed. This is accomplished by energizing latching relay coil 69, in the following manner: Push-button 60 is momentarily depressed. Current flows from power supply 43 through collector 11*a* and/or 12*a*, collector shaft 32 and/or 33, current pick-up 21, lead 40, terminal 39, lead 65, terminal 64, push-button 60, lead 68, latching relay coil 69, lead 70, terminal 71, lead 44, current pick-up 24, collector shaft 78, collector 16, to power supply 42.

To keep the carrier in motion, unlatching relay coil 72 must not be energized, since energizing of coil 72, as previously explained, opens contacts 29 and 30. From Figure 10, it can be seen that a possible current path to energize coil 72 is provided as follows: power supply line 43, collector 15*a*, collector shaft 77, current pick-up 23, lead 7, resistor 55, lead 56, terminal 57, lead 58, coil 72, terminal 71, lead 44, current pick-up 24, collector shaft 78, collector 16, to power supply 42. However, from Figure 10, it is also evident that two short circuiting paths around coil 72 have been provided. Coil 72 is not energized, as long as one or both of these short circuiting paths are completed from terminal 57 to power supply 42. One path is as follows: terminal 57, lead 59, back contacts of push-button 61, lead 67, dial common terminal 53, lead 45, current pick-up 25, collector shaft 79, collector 17, to power supply 42.

Again, starting from terminal 57, the other path is: lead 59, back contacts of push-button 61, lead 67, dial common terminal 53, dial movable contact 52, dial selective terminal 51, lead 46, current pick-up 26, collector shaft 80, collector 18, to power supply 42. If both of those short circuiting paths are simultaneously removed from power supply 42 (when collectors 17 and 18 simultaneously engage line insulators, such as 74 and 73 in Figure 11), coil 72 will be energized by the current path previously explained.

To provide selective operation of the internal circuits, additional short circuiting paths may be provided as indicated by dial selective terminals 50 and 49 connected to leads 47 and 48, current pick-ups 27 and 28, collector shafts 81 and 82 and collectors 19 and 20, respectively.

The operation of the portion of Figure 10 within the bracket C is given in connection with the description of Figure 14, which shows the carrier located at external station No. 1 along its route.

An arrangement for operating an internal circuit, such as the circuit of the driving motor of the carrier as above described, is shown in Figure 11, which shows the carrier at stop station No. 1 characterized by the line insulators or sections 74 and 73 spaced apart as required for that particular station. In Figure 11, collectors 17 and 18 are simultaneously disconnected from power supply 42 by means of the line insulators or sections 74 and 73 engaged by these collectors. It should be noted that collector 18 is in one of the previously described short circuiting paths because of the setting of dial movable contact 52 to dial terminal 51.

Terminals 91, 92, 93 and 94, together with jumper leads 75 and 76, are provided for continuity of power line 42 around insulators 73 and 74.

Figure 12 shows the carrier at stop station No. 2. Stop Station No. 2 is characterized by two line insulators or sections 89 and 85 so spaced as to simultaneously be engaged by collectors 17 and 19, which are connected to two short circuiting paths which in turn are determined by the selector dial switch. The carrier will stop since both short circuiting paths around coil 72 have been removed, allowing coil 72 to become energized.

Terminals 500, 501, 502 and 503, together with jumper leads 86 and 87, are provided for continuity of power line 42.

Figure 13 again shows the carrier at stop station No. 1. The two short circuiting paths around coil 72 are selected by the setting of the dial movable contact 52 to include collectors 17 and 19. As shown in Figure 13, the short circuiting path ending with collector 17 is removed since collector 17 is engaging insulator 74. However, the other short circuiting path ending with collector 19 is completed since collector 19 is still engaging power supply line 42. The carrier will not stop under these conditions. From Figure 13, it is seen that unless the spacing of the insulators at a station is such that both collectors, terminating the short circuiting paths, simultaneously engage the insulators, the carrier will not stop, thus giving selectivity to the control system. The insulators, such as 73 and 74 in Figures 11 and 13, represent one of the types of control or isolated segments or sections along a conductor which determine the operating characteristics of a station.

Figures 14, 15 and 16 show a carrier causing external circuits selectively to be actuated due to the carrier passing certain predetermined points.

Reference is made to Figure 14 for a description of the operation at external station No. 1. A relay indicated by reference character 514 with coil 336 has normally open contacts 374 and 348. When the relay coil is energized, these contacts will close and the external circuit indicated by reference character 355 will be operated. The external circuit could be a trackway switch control, a light, a whistle, or the like. In Figure 14, a collector 301 picks up curent from power supply line 42. Current flows through collector 301, shaft 313, current pick-up 307, lead 319, resistor 320, lead 321 to common terminal 322 on the selective dial 328. From common terminal 322 on selector dial 328, there are two possible paths for current flow to power supply line 43. From common terminal 322 on dial 328, current flows through lead 329, current pick-up 308, collector shaft 314 to collector 302*a*. Collector 302*a* is electrically disconnected from power supply line 43, since it is engaging the line insulator 342. However, another current path from selector dial common terminal 322 is available as follows: Dial movable contact 323, terminal 324, lead 330, current pick-up 309, collector shaft 315, collector 303*a*, insulated bar section 339 in power supply line 43 (isolated by insulators 340 and 341), terminal 338, lead 337, relay coil 336, lead 335, terminal 334 to power supply line 43. Relay coil 336 is thus energized, causing its contacts 348 and 374 to close, completing a circuit through leads 346 and 347 to external circuit control 355. With the selector dial set, as in Figure 14, it is evident that collector 302*a* must engage line insulator 342 at the same time that collector 303*a* engages the insulated bar contact section 339 in order for coil 336 to be energized.

Terminals 345, 344 and 343, together with jumper leads 510 and 511, are provided for continuity of power supply line 43.

The insulated bar sections, such as section 339 in Figure 14, represent another of the types of control or isolated segments or sections along a conductor which determine the operating characteristics of a station.

Figure 15 shows the carrier at external station No. 2 with the dial movable contact 323 at terminal 325 completing a circuit to collector 304*a* through lead 331, current pick-up 310, and collector shaft 316. Collector 302*a* engages the line insulator 363 at the same time that collector 304*a* engages the insulated bar section 359 (isolated by insulators 357 and 358). Coil 350 of relay 515 of station 2 is then energized as follows: power supply line 42, collector 301, collector shaft 313, current pick-up 307, lead 319, resistor 320, lead 321, common terminal 322 of selector dial 328, dial movable contact 323, dial terminal 325, lead 331, current pick-up 310, collector shaft 316, collector 304*a*, insulated bar section 359, terminal 360, lead 349, coil 350, lead 351, terminal 362, to power supply line 43. Since coil 350 has thus been energized, its contacts 354 and 375 are closed to complete and operate external circuit 356 through leads 352 and 353.

Terminals 403, 361, 364 and 365, together with jumper leads 512 and 513 are provided for continuity of power supply line 43.

Figure 16 shows the carrier at external station No. 1. The selective dial on the carrier, however, is set for external station No. 2, since the dial movable contact 323 is set to dial terminal 325, bringing collector 304*a* into the circuit through lead 331, current pick-up 310 and collector shaft 316. Coil 336 is not energized under these conditions, since collectors 302*a* and 304*a* do not simultaneously engage the control or isolated segments or sections in the form of insulator 342 and insulated bar section 339 at that station.

In similar manner, coil 336 would not be energized had dial movable contact 323 been set to terminals 326 or 327 making contact with collectors 305*a* and 306*a*, through leads 332 and 333, current pick-ups 311 and 312, shafts 317 and 318, respectively, since collectors 302*a* and 305*a* or 306*a* do not simultaneously engage inserted insulator 342 and insulated bar section 339 at that station.

It is evident that as many selective "circuit in" stations or "circuit out" stations as may be required can be effected by adding collectors and selective points on the selective switch dials, together with corresponding predetermined definitely spaced line insulators and insulated bar sections to provide the operating characteristics desired at each station.

It is also to be noted that any power collector at the power supply line 43 potential will not operate coil 350 or 336 (Figures 15 and 16) through their respective insulated bar sections 359 and 339, since the other side of coils 350 or 336 are also connected to power supply line 43.

It is also to be noted that the direction of travel of the carrier will not affect in any way the operation of the arrangements for "circuit in" stations or for the "circuit out" stations.

Our invention is adapted for control uses as will be readily apparent, including control of electric trains, both full size and toy, and control of electric powered conveyors on mono-rail systems having the general class of physical construction or mechanical form illustrated in United States Patents No. 2,349,120; No. 2,392,417, No. 2,401,115; No. 2,486,221; No. 2,486,222; and No. 2,596,-347 upon past invention of Ralph W. Spafford, and control of many other kinds of carriers movable along two or more electrical conductors.

It is to be understood that we are not limited to the operation of relay coils, both normally open and normally closed, but our invention includes the operation of other devices responsive to change of current flow therethrough, such as vacuum tubes or electronic valves. It is also to be understood that our invention includes the use of collectors, not only of the wheel or trolley type but also shoes or sliding elements that engage a conductor. It is further to be understood that our invention comprehends its adaptation and use in a polyphase power system electrically driving a carrier and having more than two conductors, our drawings showing only two conductors for purposes of simplicity. Our invention is also adaptable for both alternating current and direct current systems.

The present disclosure includes the description contained in the appended claims as well as that contained in the foregoing description and in the drawings.

Although this invention has been described in its preferred form with a certain degree of particularity, it is understood that the present disclosure of the preferred form has been made only by way of example and that numerous changes in the details of construction and the combination and arangement of parts may be resorted to without departing from the spirit and scope of the invention as hereinafter claimed.

What is claimed is:

1. In apparatus having a carrier movable along a route, a system for controlling at a station along the route of the carrier an operating electrical circuit incident to use of the carrier, comprising a pair of elongated electrical conductors, first current collector means movable with said carrier along said route to engage and collect current from said first conductor, said first current collector means moving along said first conductor in a line of contact coinciding with the engaged elongated surface of the first conductor, second current collector means movable with said carrier along said route to engage and collect current from said second conductor, the first of said collector means including a plurality of collectors spaced apart longitudinally of said route at predetermined spaced intervals along said line of contact as the carrier moves along said route, insulating means disposed along said first conductor in said line of contact to electrically insulate the collectors of said first collector means from said first conductor at a plurality of predetermined spaced locations along said line of contact corresponding in longitudinal spacing wtih said predetermined spaced intervals of the collectors of said first collector means, electrically operable means responsive to change in current supplied thereto for controlling the flow of current in said operating electrical circuit, first electrical connecting means for electrically connecting said second current collector means and the said collectors of said first collector means corresponding in longitudinal spacing with said predetermined locations, second electrical connecting means for electrically connecting said electrically operable means with said first conductor and said second collector means to supply current to said electrically operable means, said first electrical connecting means having a portion common with said second electrical means and a portion not common with said second electrical connecting means, said non-common portion of the first electrical connecting means being electrically connected with said collectors, respectively, of said first collector means, said common portion being movable with the said carrier, and means for limiting the flow of current between said conductors through said electrical connecting means, the simultaneous insulation of said collectors of the first collector means at said spaced locations diverting the flow of current from said non-common portion of said first electrical connecting means to change the flow of current supplied to said electrically operable means through said second electrical connecting means to operate said electrically operable means.

2. Apparatus as defined in claim 1, and in which the first current collector means includes more than two collectors spaced apart from each other longitudinally of the route at predetermined spaced intervals along said line of contact, and also comprising selective means for selecting a certain combination of collectors but less than all of the collectors of said collector means and electrically connecting only the selected combination of collectors with said first electrical connecting means.

3. In apparatus having a carrier movable along a route, a system for controlling at a station along the route of the carrier an operating electrical circuit incident to use of the carrier, comprising a first and a second elongated electrical conductor, first current collector means movable with said carrier along said route to engage and collect current from said first conductor, said first current collector means moving along said first conductor in a line of contact coinciding with the engaged elongated surface of the first conductor, second current collector means movable with said carrier along said route to engage and collect current from said second conductor, the first of said collector means including a plurality of collectors spaced apart longitudinally of said route at predetermined spaced intervals along said line of contact as the carrier moves along said route, first insulating means disposed along said first conductor in said line of contact to electrically insulate from said first conductor a first collector of said first collector means at one location of a plurality of predetermined spaced locations along said line of contact, second insulating means for electrically insulating a section of said first conductor from adjoining aligned portions of said first conductor at another location of said plurality of spaced locations, said spaced locations being spaced in correspondence with the longitudinal spacing of said predetermined spaced intervals of the said plurality of collectors of said first collector means, electrically operable means responsive to change in current supplied thereto for controlling the flow of currents in said operating electrical circuit, first electrical connecting means for electrically connecting said second current collector means with the said plurality of collectors of said first collector means, second electrical connecting means for electrically connecting said electrically operable means between an energized portion of said first conductor and said insulated section whereby when a second collector of said first collector means engages said insulated portion electrical current will be supplied to the electrically operable means, said first electrical connecting means having a first portion and a second portion, said first portion of the first electrical connecting means being electrically connected with said one collector of the first collector means, said second portion being movable with the said carrier and electrically connected with said second collector of the first collector means and, upon engagement of the said second collector with said insulated section, being electrically connected with said second electrical connecting means, and means for limiting the flow of current between said conductors through said electrical means, the simultaneous concurrence of said collectors of the first collector means with said spaced locations along said line of contact diverting the flow of current from the first portion of said first electrical connecting means to change the flow of current supplied to said electrically operable means through said second electrical connecting means to operate said electrically operable means.

4. Apparatus as defined in claim 3 and in which the first current collector means includes a plurality of more than two collectors, and also comprises selective means for connecting with said first electrical connecting means only a selected combination of said collectors but less than all of said collectors and omitting therefrom any non-selected collector of said first current collector means.

5. The combination of a plurality of conductor bars disposed along a route, a carrier movable along said route adjacent said plurality of conductor bars, said bars being adapted to be electrically energized, an operating electrical circuit incident to the use of the carrier, electrically operable means responsive to changes in current flow therethrough and connected with said operating circuit for governing said operating circuit, first means carried by said carrier and movable therewith for completing an electrical circuit between said conductor bars through said electrically operable means, second means carried by said carrier and movable therewith for completing an electrical circuit between said conductor bars and by-passing said electrically operable means, resistance means for limiting the flow of current between said conductor bars through said first and second means, connecting means spaced from said conductor bars electrically interconnecting said first means and said second means, said second means normally shunting said electrically operable means, one of said first and second means including a plurality of current collectors spaced apart at predetermined intervals along one of said conductor bars to engage the same at said intervals in moving along said route, and third means positioned at a station along said one of said conductor bars for changing at said station the current flow through said one of the first and second means, the said change in current flow at said station modifying the relative current flow in said first and second means in respect to each other to change at said station the current flow through said first means and through said electrically operable means governing said operating circuit, said third means at said station including a plurality of current-changing means spaced apart along said one conductor bar at predetermined intervals of said collectors to simultaneously engage the said collectors at said station for changing only at said station the flow of current in said one of said first and second means through the said spaced-apart collectors in simultaneous engagement with the plurality of current-changing means.

6. In apparatus having a carrier movable along the route of a pair of conductor bars and an electrical operating circuit having a function incident to use of the carrier, comprising in combination said pair of conductor bars energizable to have electrical potential, a plurality of isolated elements aligned with a first of said bars and insulated from adjoining portions of said bar in alignment therewith so as to have electrical potential differing from that of said adjoining portions of said bar in alignment therewith, said elements occurring at predetermined spaced positions at a station along said first bar where said operating circuit is to be modified, electrically operable means responsive to changes in flow of electric current to which said electrically operable means is subjected for controlling said operating circuit, a plurality of electrical collectors movable with said carrier along said route in engagement with said first bar, said collectors being spaced apart at predetermined intervals along said first bar, a contact member movable with said carrier and in electrical contact with the second of said bars, first electrical connecting means movable with said carrier for connecting said collectors and said contact member through a common connecting point spaced from said bars to complete through said collectors an electrical circuit between said bars, means limiting the flow of current between said bars through said first electrical connecting means, and second electrical connecting means electrically interconnecting said electrically operable means with said first conductor and one of said isolated elements to subject the same to changes in current flow through said second electrical connecting means, said one isolated element having such electrical potential as to provide for an electrical circuit between said bars through the second electrical connecting means only upon a first collector of said plurality of collectors engaging said one isolated element, another said isolated element having such low electrical potential as to terminate the electrical circuit between said bars through another collector of said plurality of collectors upon said another collector engaging said another isolated element, said first electrical connecting means away from said station upon both said collectors engaging said first bar normally not electrically interconnecting with said second electrical connecting means, the arrival of said carrier at said station and the simultaneous engagement of said one isolated element by said first collector and of said another isolated element by said another collector terminating direct flow of current between the conductors through the first electrical connecting means and said another collector and electrically interconnecting said first electrical connecting means and said second electrical connecting means to cause the current flowing between the conductors through the first electrical connecting means to flow through said second electrical connecting means to operate said electrically operable means.

7. In a system for operating a device along the route of a carrier, said carrier being movable along a pair of electrical conductors, said device being operable by change in flow of electrical current supplied thereto, the combination of said pair of conductors, insulation means interrupting, and located at predetermined spaced positions in alignment with, one of said conductors at a station along said route, said insulating means at said spaced positions along said conductor being at substantially zero potential, a plurality of electrical collectors movable with said carrier along said route in engagement with said one conductor at spaced intervals therealong, an engaging member movable with said carrier along the route in engagement with the other of said conductors, electrical connecting means movable with the carrier for electrically connecting said collectors and said engaging member for completing through said collectors and engaging member an electrical circuit between said conductors, resistance means for limiting the flow of current through said electrical circuit, said electrical connecting means having a first portion and a second portion electrically interconnected, said first portion being electrically connected to a plurality of said collectors whose longitudinal spacing along said route corresponds with the spacing of said predetermined positions of said insulating means at said station, said second portion electrically connecting said device between said first portion and a collector of said plurality of collectors other than the said correspondingly spaced collectors to supply current to said device, said correspondingly spaced collectors of said plurality of collectors normally away from said station effectively shunting current from said device, the arrival of said carrier at said station and the simultaneous engagement of said insulated means at said spaced positions by said correspondingly spaced collectors removing said shunt from said device to cause said device to operate.

8. In a system for operating an electrical device along the route of a carrier, said carrier being movable along a pair of electrical conductors, said device being operable by change in flow of electrical current supplied thereto, the combination of said pair of conductors, said electrical device, a plurality of isolated elements interrupting, and located at predetermined spaced positions in alignment with, one of said conductors at a station along said route, at least one of said isolated elements being insulated from said one conductor to possess substantially zero potential, another of said isolated elements being insulated from adjacent aligned portions of said one conductor, a plurality of electrical collectors movable with said carrier along said route in engagement with said one conductor at spaced intervals therealong, an engaging member movable with said carrier along the route in engagement with the other of said conductors, electrical connecting means movable with the carrier for electrically connecting said collectors and said engaging member for completing through said collectors and engaging member an electrical circuit between said conductors, means for limiting the current through said electrical circuit between said conductors, said electrical connecting means having a first portion and a second portion electrically interconnected, said first portion being electrically connected to a first collector of a plurality of said collectors whose longitudinal spacing along said route corresponds with the spacing of said predetermined spaced positions of said isolated elements, said second portion being electrically connected to a second collector of said plurality of correspondingly spaced collectors, circuit means electrically connecting said device with said another isolated element and said one conductor to supply to said device current passing between said conductors through a collector engaging said another isolated element at said station, a first electrical circuit being provided between said conductors by said engaging member, said first portion of the electrical connecting means, and said first collector when said collectors are away from said station, a second electrical circuit being provided between said conductors by said engaging member, said second portion of the electrical connecting means, the said second collector, said another isolated element upon engagement therewith by said second collector, and the said circuit means through the said device, said electrical connecting means normally completing an electrical circuit between said conductors through both said portions and not through said circuit means when said collectors are away from said station, the simultaneous engagement of said at least one isolated element by said one collector and of said another isolated element by said second collector terminating the flow of current through said first electrical circuit and passing of current through said second electrical circuit and said circuit means to operate said device.

9. In apparatus having a carrier movable along the route of a pair of substantially parallel conductors adapted to be energized by a source of electrical energy, the combination of a plurality of current collectors spaced apart along said route and movable along a first of said conductors to engage the same at spaced intervals therealong, electrical connecting means providing electrical connections between said collectors and a second of said conductors through a common connecting point spaced from said first conductor for completing an electrical circuit therethrough between said conductors, electrically operable means responsive to change in flow of current therethrough for controlling an operating circuit incident to use of the carrier, said electrical connecting means providing alternate paths from said common connecting point for current to pass between said conductors through said electrical connecting means, means limiting the flow of current between said conductors through said electrical connecting means, said electrical connecting means electrically connected to a pair of said plurality of spaced-apart collectors providing a first of said alternate paths and said electrical connecting means connected to a collector of said plurality of spaced-apart collectors other than said pair of collectors providing the second of said alternate paths, one of said paths being through said electrically operable means and the other of said paths bypassing said electrically operable means, said electrical connecting means and electrically operable means having electrical resistances proportioned to bias the flow of current in favor of the first of said paths relative to the second of said paths, and insulating means at a station along said route and positioned along said first conductor at a plurality of spaced intervals corresponding to the spacing of said pair of collectors to simultaneously insulate from said first conductor said pair of collectors engaging said insulating means at said station, the simultaneous engagement of said insulating means by said pair of collectors and the engagement of said first conductor by said collector other than said pair of collectors causing current in said first path in opposition to said bias to flow in said second path to provide a change in flow of current to said electrically operable means and operation of the same.

10. In apparatus having a carrier movable along the route of a pair of substantially parallel conductors adapted to be energized by a source of electrical energy, the combination of a plurality of current collectors spaced apart along said route and movable along a first of said conductors to engage the same at spaced intervals therealong, electrical connecting means providing elcetrical connections between said collectors and a second of said conductors through a common connecting point spaced from said first conductor for completing an electrical circuit therethrough between said conductors, electrically operable means responsive to change in flow of current therethrough for controlling an operating circuit incident to use of the carrier, said electrical connecting means providing alternate paths from said common connecting point for current to pass between said conductors through said electrical connecting means, means for limiting the flow of current between said conductors through said electrical connecting means, said electrical connecting means electrically connected to a first collector of said plurality of spaced-apart collectors providing a first of said alternate paths and a said electrical connecting means connected to a second collector of said plurality of spaced-apart collectors providing a second of said alternate paths, and insulating means at a station along said route and disposed along said first conductor in respect to a plurality of spaced positions along said first conductor corresponding to the spacing of said first and second space-apart collectors, said insulating means at a first of said positions being disposed to electrically insulate from said first conductor a collector positioned at said first position, said insulating means at a second of said positions being disposed to electrically insulate the first conductor at said second position from the adjoining aligned portions of the first conductor to isolate a segment of the first conductor at said second position, circuit means electrically connecting said electrically operable means with said isolated segment of the first conductor and said first conductor at a point away from said isolated segment to cause current passing between said conductors through said isolated segment to be passed through said electrically operable means, the said isolated segment being simultaneously engageable by the said second collector upon engagement of the insulating means at said first position by the said first collector, the said electrical connecting means, said collectors, electrically operable means, and circuit means having resistances proportioned to bias the flow of current in favor of said first path between said conductors, the simultaneous arrival of said first and second collectors at said station having said correspondingly spaced positions, respectively, along the first conductor and engagement of said insulating means at the first of said positions by said first collector causing the current in said first in opposition to said bias to flow in said second path and through said second path to said isolated segment engaged by said second collector, and hence through the said circuit means to change the flow of current to said electrically operable means and operation of the same.

11. Apparatus for electrically operating an electrically operable device responsive to change in electrical current applied thereto at a station along the route of a carrier movable along a pair of electrical conductors comprising the combination of said electrically operable device, a plurality of more than two electric current collectors carried by and movable with said carrier and spaced apart along said route to engage the first of said conductors at spaced intervals longitudinally of said first conductor, said collectors including a pair of collectors having a longitudinal spacing therebetween and another collector longitudinally spaced from said pair of collectors, an engaging member carried by and movable with said carrier and electrically engaging a second of said conductors, electrical connecting means interconnecting said engaging member and said plurality of collectors to establish an electrical circuit between said conductors, resistance means limiting the flow of current between the conductors through the electrical connecting means, said electrical connecting means being carried by and movable with the carrier, and insulation means at the location of said station and mounted on said first conductor at a pair of positions spaced apart along said first conductor in correspondence with the spacing between said pair of collectors to bar passage of current between said first conductor and said pair of collectors in simultaneous engagement with said insulating means at said spaced-apart positions, said insulating means being disposed to permit said another collector to electrically engage said first conductor upon said simultaneous engagement of the insulating means by said pair of collectors, said electrical connecting means having a first branch and a second branch electrically interconnected, said first branch electrically connecting said engaging member and the said pair of collectors and said second branch electrically connecting said engaging member and said another collector, said second branch being electrically connected to said device to subject said device to change in flow of current through said second branch, said electrical connecting means having resistances proportioned to bias the flow of current in favor of said first branch relative to said second branch, the passage of current between said conductors through said electrical connecting means at said station being changed in opposition to said bias by the simultaneous engagement at said station of said insulating means by said pair of collectors to cause current flowing in said first branch to flow in said second branch of the electrical connecting means, said change in flow of electric current in said electric connecting means operating said device.

12. Apparatus for electrically operating a device responsive to change in electrical current supplied thereto at a station along the route of a carrier along a pair of electrical conductors, comprising the combination of a plurality of electric current collectors carried by and movable with said carrier and engaging the first of said conductors at spaced intervals longitudinally of said first conductor, an engaging member carried by and movable with said carrier and electrically engaging the second of said conductors, first electrical circuit means electrically connecting said engaging member and collectors for completing an electrical circuit between said conductors, resistance means limiting the flow of current between said conductors through said first electrical circuit means, second electrical circuit means electrically connected to said device to subject said device to change in flow of current through said second electrical circuit means to operate said device, first electrical insulation means in alignment with the said first conductor at the location of said station and mounted along said first conductor to bar passage of current between said first conductor and a collector engaging said first insulating means, and second electrical insulation means at the location of said station and disposed to electrically insulate a section of said first conductor from adjoining aligned portions of said first conductor, said second electrical insulation means being disposed to expose said insulated section for electrical contact with a collector engaging the insulated section, said second electrical circuit means electrically connecting said insulated section and said first conductor with said device to subject said device to change in flow of current through said second electrical connecting means between said first conductor and said insulated section, said first electrical circuit means connecting, and providing a first electrical path between, said engaging member and a first collector of a pair of said collectors whose longitudinal spacing coincides with the spacing between said first insulation means and said insulated section along said first conductor at said station, flow of current through said one path being terminable by engagement of said first insulation means and said first collector, said first electrical circuit means also connecting, and providing a second electrical path between, said engaging member and a second collector of said pair of collectors, the engagement of said insulated section by said second collector establishing an electrical circuit between said conductors through said second electrical circuit means, through said insulated section, through said second collector engaging the said insulated section, and through the second path of said first circuit means, the simultaneous engagement of the said first and second collectors, respectively, of said pair of collectors with the correspondingly spaced first electrical insulation means and insulated section causing the current flowing through the first electrical connecting means to flow through said second electrical connecting means and to said device to operate the same.

13. In apparatus having a carrier movable along a pair of elongated substantially parallel electrical conductors, a system for controlling at a station along the route of the carrier an operating electrical circuit incident to the use of the carrier, comprising in combination, first electrical collecting means movable with the carrier along said route in engagement with a first of said conductors, second electrical collecting means movable with the carrier along said route in engagement with a second of said conductors, said first collecting means including a supply collector and a plurality of control collectors spaced apart at positions along the line of said first conductor, insulating means positioned along said first conductor relative to spaced points along the first conductor at said station in correspondence with the spaced positions of said control collectors and simultaneously engageable, respectively, by said spaced control collectors for insulating at said points the engaged control collectors from said first conductor, electrically operable means for governing the flow of current in said operating electrical circuit, and first and second electrical circuit means movable with the carrier and electrically connected to said second collecting means, said first electrical circuit means being electrically connected to the said control collectors spaced apart in correspondence with said spaced points at said station for establishing an electrical circuit therethrough between said conductors, said second electrical circuit means being electrically connected to the said supply collector for establishing an electrical circuit therethrough between said conductors, resistance means limiting the flow of current between said conductors through said electrical circuit means, the second of said first and second electrical circuit means being electrically connected with said electrically operable means to operate the same upon change in current flow through said one electrical circuit means and the other by-passing said electrically operable means, said first and second electrical circuit means biasing the flow of current therethrough in favor of said first electrical connecting means, the simultaneous engagement at said station of said control collectors and the said insulating means at said spaced points, respectively, causing, in opposition to said bias, the current flowing between said conductors through said first electrical connecting means to flow in said second electrical connecting means, the change in current flow through the said one electrical circuit means connected to said electrically operable means operating the same.

14. In a control system for a carrier movable along the route of a pair of parallel electrical conductors to control an electrically operable device governing an electrical circuit incident to use of the carrier, a combination comprising said pair of electrical conductors, first means movable with the carrier for establishing an electrical circuit between the said conductors, second means for limiting the flow of current between the conductors through said first means, third means for electrically connecting said device and said first means for including said device in said electrical circuit between said conductors, said first means normally shunting said third means and said device, fourth means operable at a station along said route for overcoming said shunting to cause said device to operate, said fourth means including fifth means and sixth means electrically included in and movable with said first means and spaced apart longitudinally of said route and making electrical contact with said first conductor away from said locations for effecting with said first means the establishment of said electrical circuit between the said conductors, said fourth means also including seventh means and eighth means positioned at said station along said first conductor at fixed locations spaced apart longitudinally of said route in correspondence with the spacing apart of said fifth means and said sixth means for changing at said station the flow of current in said electrical circuit of said first means upon the simultaneous electrical engagement of said fifth means with said seventh means and said sixth means with said eighth means.

References Cited in the file of this patent

UNITED STATES PATENTS

| | | |
|---|---|---|
| 833,211 | Hilliard | Oct. 16, 1906 |
| 1,243,457 | Stuart | Oct. 16, 1917 |
| 1,544,882 | Bethenod | July 7, 1925 |
| 1,797,651 | Gergacsevics et al. | Mar. 24, 1931 |
| 1,797,864 | Harlandt | Mar. 24, 1931 |
| 1,817,692 | Kloss et al. | Aug. 4, 1931 |
| 2,056,040 | Dozler | Sept. 29, 1936 |
| 2,231,174 | Trogner | Feb. 11, 1941 |

(Other references on following page)

UNITED STATES PATENTS

| | | |
|---|---|---|
| 2,349,120 | Spafford | May 16, 1944 |
| 2,392,417 | Spafford | Jan. 8, 1946 |
| 2,401,115 | Spafford | May 28, 1946 |
| 2,614,506 | Mullerheim | Oct. 21, 1952 |
| 2,620,385 | Grant | Dec. 2, 1952 |
| 2,688,931 | Spafford | Sept. 14, 1954 |
| 2,688,932 | Heil | Sept. 14, 1954 |
| 2,688,933 | Spafford | Sept. 14, 1954 |

OTHER REFERENCES

"Automatic Materials Handling," by The Louden Machine Co., Fairfield, Iowa, U.S.A., printed in U.S.A., 24 pages.